(No Model.)

C. J. HIRLIMANN.
GALVANIC BATTERY.

No. 448,798. Patented Mar. 24, 1891.

WITNESSES:
Frank S. Ober
Edward A. Wagner

INVENTOR
Charles J. Hirlimann
BY
ATTORNEY.

UNITED STATES PATENT OFFICE.

CHARLES J. HIRLIMANN, OF FORT LEE, NEW JERSEY.

GALVANIC BATTERY.

SPECIFICATION forming part of Letters Patent No. 448,798, dated March 24, 1891.

Application filed November 26, 1890. Serial No. 372,713. (No model.)

*To all whom it may concern:*

Be it known that I, CHARLES J. HIRLIMANN, a citizen of the United States, residing in Fort Lee, county of Bergen, State of New Jersey, have invented certain new and useful Improvements in Galvanic Batteries, of which the following is a specification.

My invention relates to improvements in galvanic batteries, and has particular reference to the shape of the carbon element therein and to the construction of the cover of the cell.

The object of the invention is to provide a battery which will generate nearly its full current immediately after it is mounted, and also to provide a battery-cell in which the cover may be quickly put into place, and when once fixed will not become easily detached by rough handling.

Figure 1:
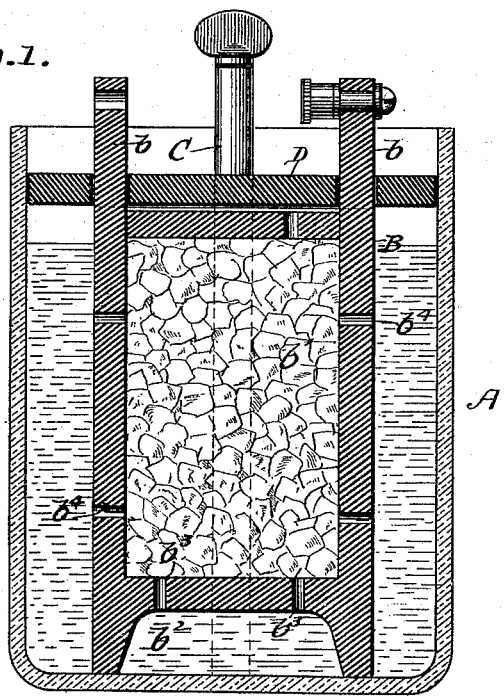
Figure 2:
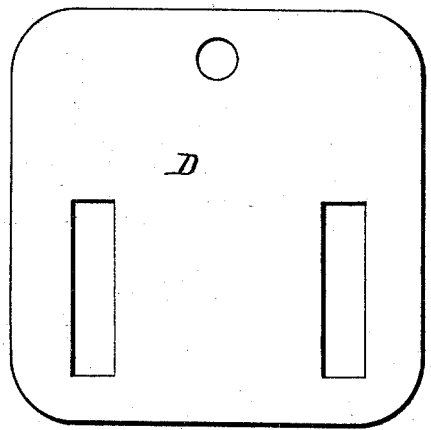

In the accompanying drawings, Figure 1 represents a central vertical section of my improved battery-cell, and Fig. 2 a plan of the cover thereof.

A represents the outer jar containing the elements of the battery; B, the carbon or negative element; and C, the zinc or positive element. The zinc is of the ordinary pencil type, but the carbon serves the functions of a porous cup, as well as that of one of the elements of the battery. It is in the form of a rectangular cup or jar made of compressed molded carbon and provided on two of its opposite upper edges with outwardly-projecting ears $b\ b$. The cup contains any of the usual depolarizing agents $b'$. The bottom of this carbon cup, instead of being flat, is concaved or dished, as shown at $b^2$, and the said bottom is formed with three or four holes or perforations $b^3$. The sides of the cup are also provided with several holes $b^4$.

In the ordinary working of a battery of this kind after the carbon or porous vessel has been placed into the solution it requires some considerable time for the latter to penetrate the walls of the cup sufficiently to set up the full action of the battery; but with my improved cup having the concaved bottom the solution or liquid is forced to penetrate the interior of the cup while it is being passed down through the liquid to the bottom of the cell. The downward motion of the cup, together with the concavity in the bottom thereof, causes the liquid to flow rapidly through the perforations in the bottom of the cup and attack the material inside.

The cover D of the vessel is made of a shape to fit inside of the outer jar and is provided with three openings, through two of which the upward extensions $b$ of the carbon cup pass, the other one receiving and supporting the zinc pencil. Connection with the carbon element is made by means of binding-posts fitted to one or both of the extensions $b$ and with the head of the zinc pencil. With this construction the cover is maintained in place and prevented from twisting. It is conveniently applied and is simple in construction.

Having thus described my invention, I claim—

In a galvanic battery, a porous vessel made of molded carbon and filled with manganese or other depolarizing agent and having a concaved bottom, the said bottom being provided with perforations, whereby when the vessel is inserted into the solution the latter will be forced through the perforations into contact with the depolarizing agent and immediately render the battery active.

In witness whereof I have hereunto signed my name in the presence of two subscribing witnesses.

CHARLES J. HIRLIMANN.

Witnesses:
FRANK S. OBER,
EDWARD A. WAGNER.